Patented Dec. 27, 1932

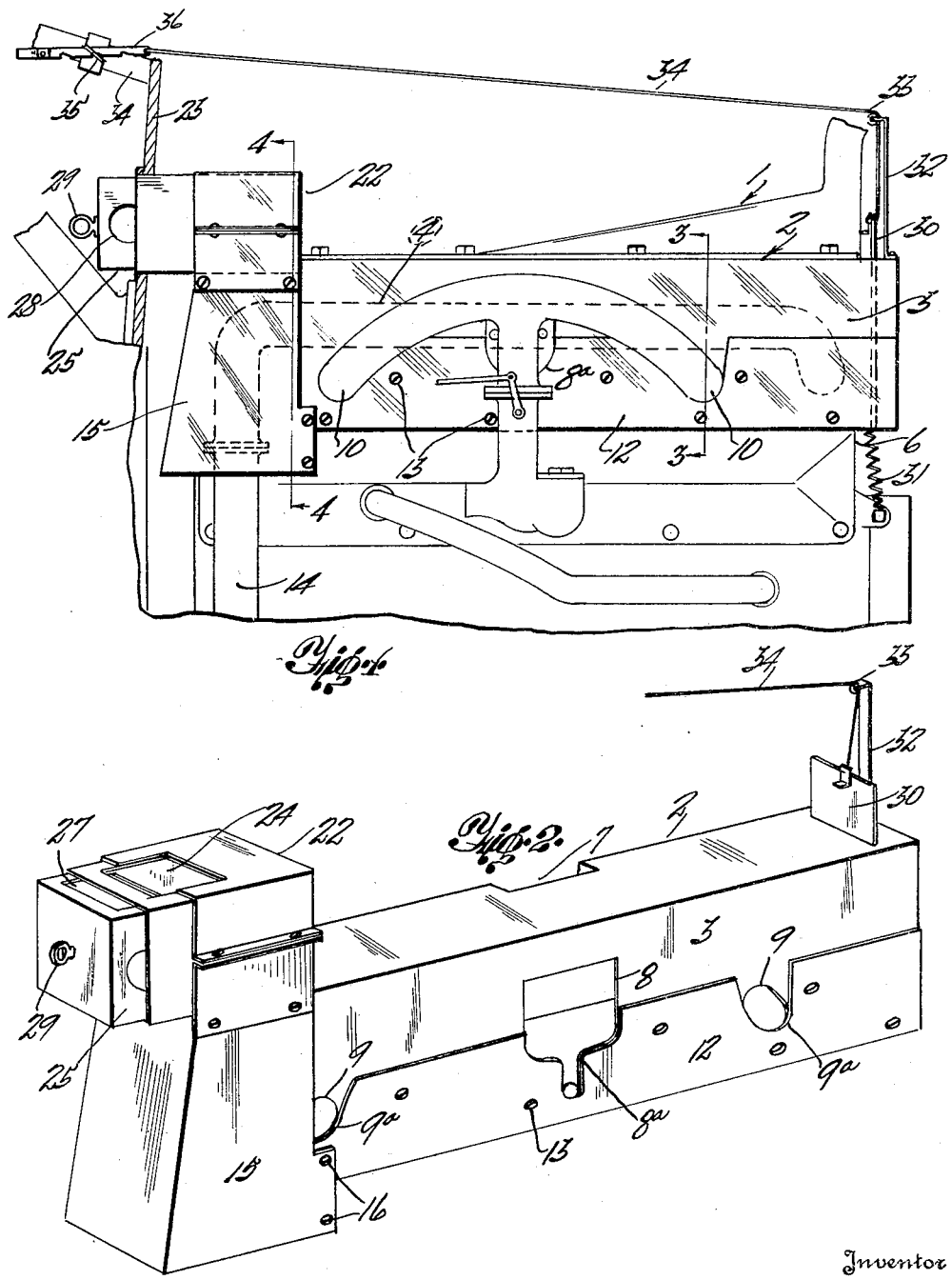

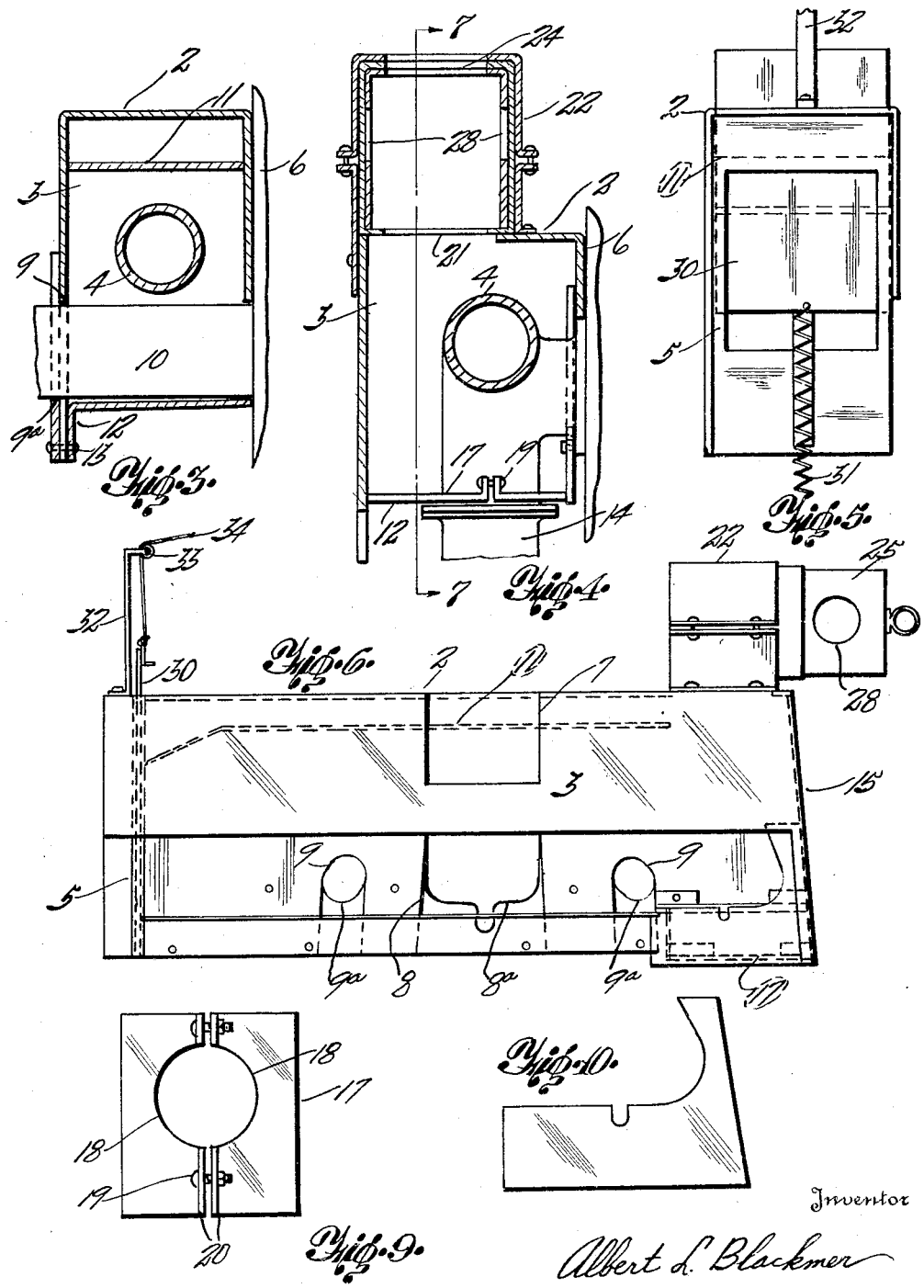

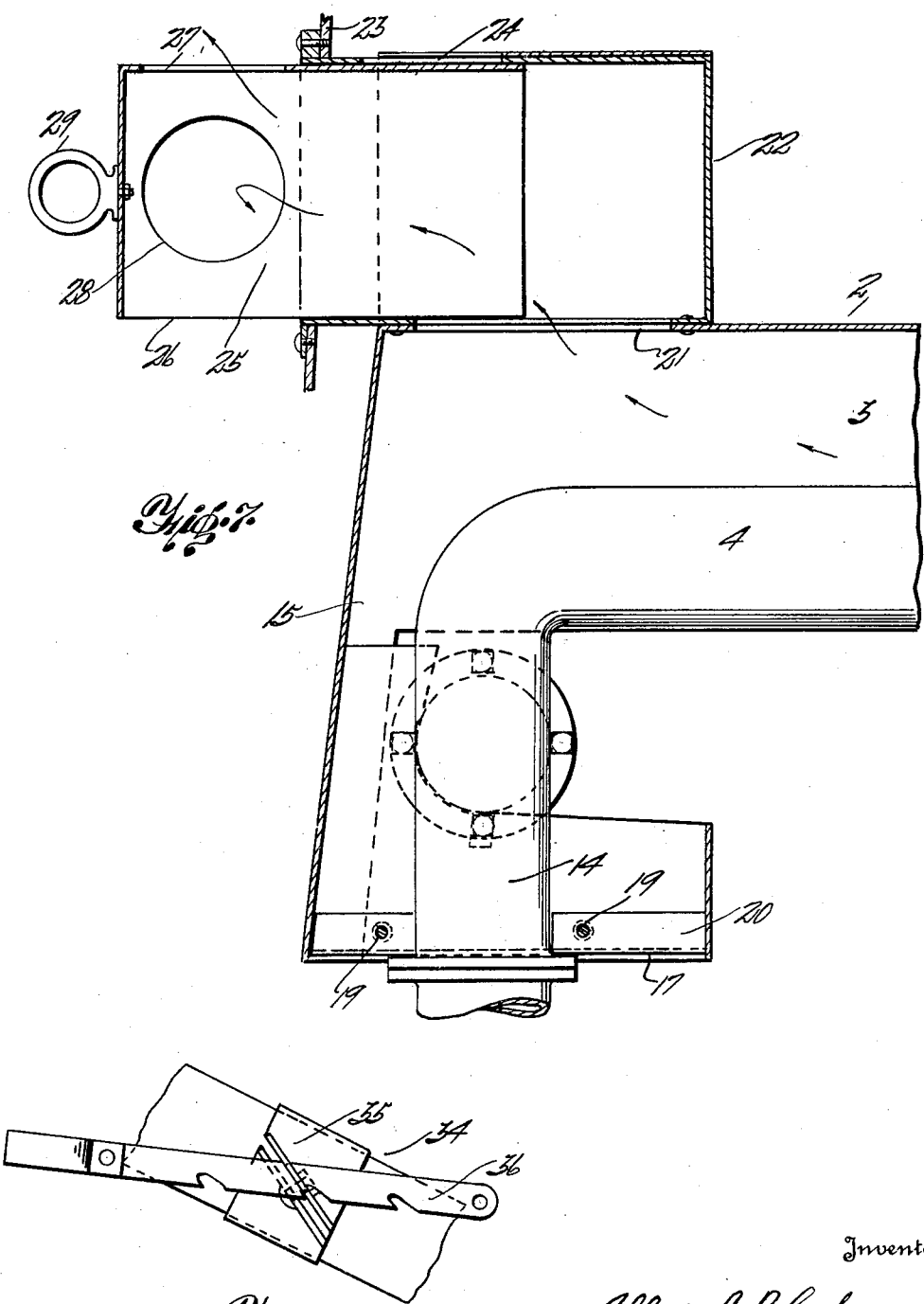

1,892,201

UNITED STATES PATENT OFFICE

ALBERT L. BLACKMER, OF PETERSON, IOWA

AUTOMOBILE HEATER

Application filed March 19, 1930. Serial No. 436,934.

This invention is an automobile heater designed for heating the passenger compartment of an automobile through the heat thrown off by the exhaust pipe and engine.

The object of the invention is to provide in a relatively simple, practical and convenient form a hot air heater adapted for installation upon an automobile, whereby the heat thrown off from the engine and exhaust pipe will be conducted back into the body of the machine. Another object is to provide a special form of hot air register or hot air collector and distributor, for passing or transmitting heated air from the engine side of the automobile to the passenger side thereof, with means embodied for regulating the flow of the air or for cutting same off entirely, as may be desired.

While the embodiment of the invention as here shown is especially adapted for installation upon a Model A, Ford automobile, it will be understood that with some minor modifications the invention may be installed as well upon various other types of automobiles.

In the drawings

Figure 1 is a side elevation of the invention as mounted upon a Model A, Ford, the dash of the car being shown in section;

Figure 2 is a perspective view of the heater alone, the view being enlarged relative to Figure 1;

Figure 3 is a section on the line 3—3 of Figure 1, the view being enlarged relative to Figure 1;

Figure 4 is a section on the line 4—4 of Figure 1, the view being enlarged relative to Figure 1;

Figure 5 is a front end elevation, enlarged relative to Figure 1;

Figure 6 is an inside elevation of the side of the casing shown in Figure 1;

Figure 7 is a section along the line 7—7 of Figure 4, the view being enlarged relative to Figure 4;

Figure 8 is an enlarged detail view of the notched slide bar and associated elements for adjusting the flow of air through the heater;

Figure 9 is an enlarged detail in plan of the casing closure at the exhaust pipe;

Figure 10 is an enlarged detail of a portion of the casing adapted to fit at the left hand side, rear end.

As shown in this embodiment, the invention comprises, in combination with a conventional form of engine 1, such for instance as used upon the Model A, Ford automobile, a suitable casing 2 made up of sheet metal or any other suitable material, and including an upper heat collecting casing 3 adapted to seat longitudinally over the exhaust pipe 4 from end to end of the engine, the said casing being in the nature of an inverted trough, and having a door frame 5 depending at its forward end. This part 3 of the casing is designed to fit over the top of the exhaust pipe next to the cylinder block 6, and there is a cut-out 7 provided on the side of the casing next to the block to accommodate the distributor at that side. There are also a central cut-out 8 and spaced cut-outs 9 upon the opposite side to accommodate the intake pipes 10. A spaced lining 11 is mounted within the upper portion of the casing 3 to retard the dissipation of heat. A complementary lower L-shaped casing 12 is bolted at 13 to the upper casing 3, the same having cut-outs 8a and 9a to register with the cut-outs 8 and 9 of the element 3 for the accommodation of the pipes 10. At the rear the down-pipe 14 of the exhaust 4 is enclosed with a vertically elongated boxing 15 which is secured to the casing 2 by bolts 16, or may be formed integrally, and communicates interiorly therewith. The boxing 15 is closed at its lower end around the down-pipe 14 by means of a bottom plate 17 made in halves having semi-circular cut-outs 18, the said halves being secured together around the pipe 14 by means of bolts 19 passed through upturned flanges 20 upon the inner margin of the said halves. There is an opening 21 at the upper end of the boxing 15, and a hot air collector 22 is mounted thereover, the same being rectangular in form and communicating interiorly with the said boxing 15. The forward end of this hot air collector extends through the dash 23 and is left open. An opening 24 is also formed through the upper side of the hot air collector upon the engine side of the dash.

A hot air distributor 25 is slidably mounted in the hot air collector 22, the same being left open at its under side as shown at 26, and partially cut out at its upper side as shown at 27, and upon its sides as shown at 28, the said openings 27 and 28 being adapted to be exposed at the passenger side of the dash as the distributor is pulled out. This arrangement allows heat to escape in all directions within the body of the car when the distributor is pulled out by the knob 29. A door 30 is slidably mounted within the door frame 5 and adapted to close over the front end of the casing 2 when lowered. A spring 31 normally holds the door in its closed position. An upright or brace 32 is mounted at the forward end of the casing and carries a pulley 33 at its upper end. A cable 34 is secured to the upper end of the door 30 and passed over the pulley 33 back through the dash 23 to the hand of the driver. A bracket 34 is mounted upon the inner side of the dash and carries a loop 35 through which is passed a notched slide bar 36 secured to the inner end of the cable 34. Thus the door 30 may be opened to varying degrees by pulling upon the cable 34 and latching the bar 36 at the point desired. When the distributor 25 is entirely closed, no heat escapes into the body of the car but is discharged under the hood of the car. When heat is desired within the car, this is supplied by drawing out the distributor 25 to the extent required and opening the door 30 to the degree necessary to provide a current of air through the casing, the air becoming heated as it passes through the casing into the car.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In combination with a dash of an automobile, a device of the kind described, comprising a hot air collector having an open end extended through the dash into the passenger compartment, the said hot air collector having openings also through its upper and lower sides at the engine side of the dash, a hot air distributor slidably mounted in the hot air collector through the open end thereof leading into the passenger compartment, the said distributor being open at its under side and having an opening also through its upper side adapted to be exposed within the passenger compartment as the distributor is pulled out, and to register with the upper opening of the hot air collector at the engine side of the dash when pushed in.

2. In combination with the dash of an automobile, a device of the kind described, comprising a squarely formed hot air collector having an open end extended into the passenger compartment and a boxed end extended at the engine side, the latter end having air ports through its upper and lower sides, a squarely formed hot air distributor slidably mounted in the said hot air collector through the open end thereof leading into the passenger compartment, the said distributor being open throughout at its under side, and having an opening also through its upper side adapted to be exposed within the passenger compartment as the distributor is pulled out and to register with the upper air port of the hot air collector at the engine side of the dash when pushed in, the squared formations of the hot air collector and distributor coacting to maintain the said elements and air ports in operative alignment.

In testimony whereof I affix my signature.

ALBERT L. BLACKMER.